(12) United States Patent
Claesson et al.

(10) Patent No.: US 6,656,251 B1
(45) Date of Patent: Dec. 2, 2003

(54) PROCESS AND A PLANT FOR PURIFYING OF A LIQUID

(75) Inventors: Brith Claesson, Vasteras (SE); Tor Moxnes, Osteras (NO)

(73) Assignee: ABB AS, Billingstad (NO)

( * ) Notice: Subject to any disclaimer, the term of this patent is extended or adjusted under 35 U.S.C. 154(b) by 39 days.

(21) Appl. No.: 10/031,572

(22) PCT Filed: Jul. 19, 2000

(86) PCT No.: PCT/NO00/00243

§ 371 (c)(1),
(2), (4) Date: Jan. 22, 2002

(87) PCT Pub. No.: WO01/05708

PCT Pub. Date: Jan. 25, 2001

(30) Foreign Application Priority Data

Jul. 20, 1999 (NO) .............................. 19993560

(51) Int. Cl.[7] .............................................. B01D 19/00
(52) U.S. Cl. ............................. 95/253; 96/184; 210/188; 210/718
(58) Field of Search ................................ 210/718, 188; 95/253, 266, 241; 96/155, 193, 183, 184, 182

(56) References Cited

U.S. PATENT DOCUMENTS

| | | | | |
|---|---|---|---|---|
| 2,766,203 A | * | 10/1956 | Brown et al. | |
| 3,130,142 A | * | 4/1964 | Nathan et al. | |
| 3,363,399 A | * | 1/1968 | Schmauch et al. | |
| 3,420,039 A | * | 1/1969 | Binder | |
| RE27,309 E | * | 3/1972 | Scott et al. | |
| 4,340,489 A | * | 7/1982 | Adams et al. | |
| 4,717,484 A | * | 1/1988 | Kauffer | |
| 4,746,440 A | * | 5/1988 | Seeger | |
| 4,752,399 A | * | 6/1988 | Viator et al. | |
| 5,035,807 A | * | 7/1991 | Maree | |
| 5,094,674 A | * | 3/1992 | Schweiss et al. | |
| 5,330,655 A | * | 7/1994 | Schweiss et al. | |
| 5,453,203 A | * | 9/1995 | Higuchi | |
| 6,495,048 B2 | * | 12/2002 | Stephenson et al. | |

FOREIGN PATENT DOCUMENTS

| | | | |
|---|---|---|---|
| DE | 4200802 | * | 7/1993 |
| DE | 4439147 | * | 5/1996 |
| WO | 9612678 | * | 5/1996 |

* cited by examiner

Primary Examiner—Duane S. Smith
(74) Attorney, Agent, or Firm—Oblon, Spivak, McClelland, Maier & Neustadt, P.C.

(57) ABSTRACT

Process for purification of a liquid, said liquid being contaminated by gas, other liquids and/or solid materials, thereby a) degassing the contaminated liquid in a degassing device where at least a part of the gas and possible solid materials are removed from the liquid, b) mixing the liquid in a mixing and coagulation device by way of utilizing the energy in the liquid flowing into the mixing and coagulation device, thereby to achieve coagulation respectively flocculation of the contaminants in the liquid, and c) the coagulated or flocculated contaminants as well as gas and other liquids thereafter being separated from the liquid to be purified in a flotation and separation device.

12 Claims, 2 Drawing Sheets

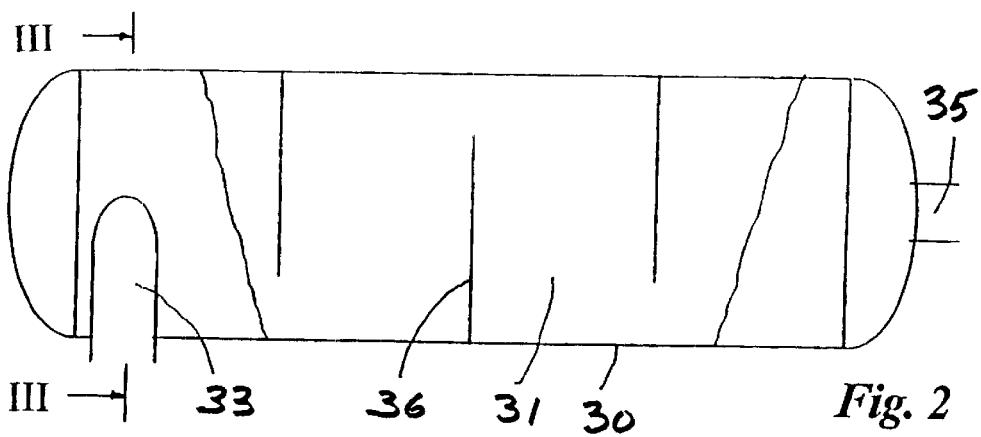
Fig. 2
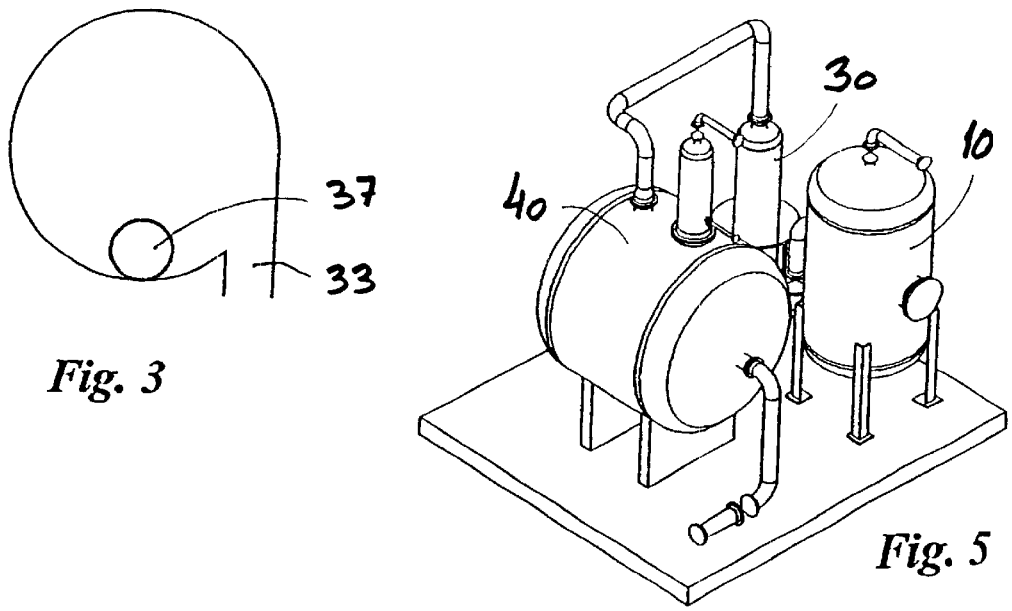
Fig. 3
Fig. 5
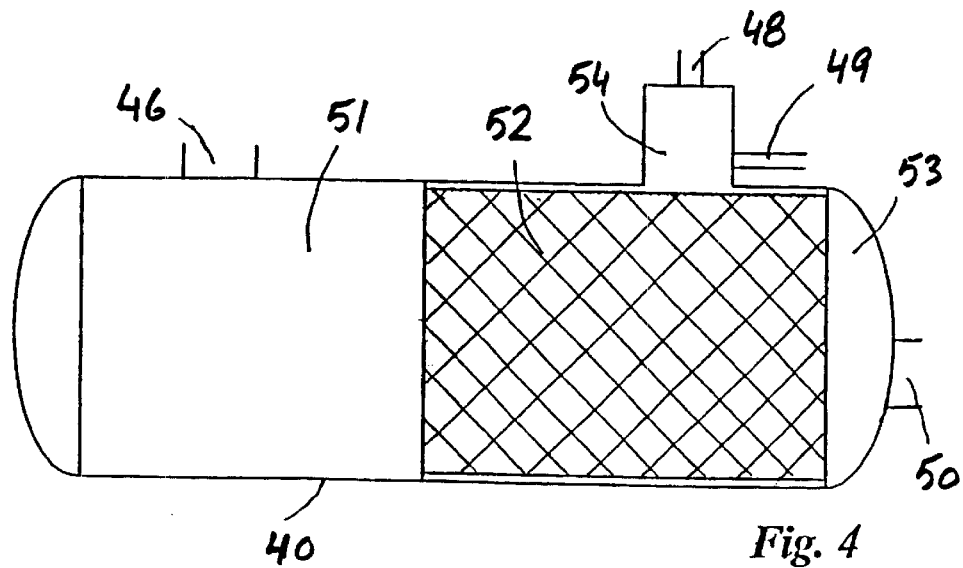
Fig. 4

PROCESS AND A PLANT FOR PURIFYING OF A LIQUID

CROSS REFERENCE TO RELATED PATENT DOCUMENTS

The present document is based on published International Patent Application No. PCT WO 01/05708, the entire contents of which being incorporated herein by reference.

BACKGROUND OF THE INVENTION

1. Field of the Invention

The present invention is related to a process and a plant for purification of a liquid, said liquid being contaminated by gas, other liquids and/or solid materials.

2. Discussion of the Background

It is known to use means like centrifuges, hydrocyclones, and flotation systems to treat waste water containing oil or other contaminants. Centrifuges are big, heavy, energy demanding and expensive especially for treating flows of above 100 $m^3/h$. Hydrocyclones have been used extensively for treating oil containing waste waters, and they have proven reliable under steady conditions. However, hydrocyclones have their disadvantages as they can not give very low outlet contaminant values, e.g. usually not under 25 mg/l dispersed oil, and if larger capacities are required a plurality of hydrocyclones is needed in parallel. A degassing tank is often used downstream of the hydrocyclones. Hydrocyclones geometrical shape leads to high production costs. A common flotation system requires big space, and usually it is not separately a high efficiency device.

By flotation a substance, e.g. in the form of droplets or particles, is removed from another directly or indirectly by means of buoyancy forces, such as when gas bubbles are supplied to one of the substances, the gas bubbles thereby attaching to the substance to be removed, by natural flotation and gas or air flotation respectively.

Flotation is performed as dissolved gas flotation when the entire or part of the liquid flow is pressurized in such a way that a desired amount of gas is dissolved in the liquid, whereafter the pressure is reduced and the gas releases as gas bubbles, or as induced gas flotation where gas is supplied directly to the liquid flow in such a way that gas bubbles are created.

To achieve a high efficiency, a complete separation process comprises destabilisation, precipitation and flocculation, addition of gas and flotation, respectively. There are many different system solutions for these unit processes in use.

By dissolved gas flotation the complete or a part of the input flow or output flow is pressurized to add gas. Separation is performed in a tank whereby the main portion of the contaminants in the form of particles/droplets float to the surface of the liquid or to the upper portion of the tank. Therefrom the contaminants are skimmed, drained or pumped away. A small fraction of the contaminants sink to the bottom where it is scraped and pumped away.

WO 96/12678 describes a process for purification of a liquid, where the liquid is contaminated by other liquids or solid materials, for example removing oil from oil contaminated water. The process comprises a flocculation device, a bubble generator, and a flotation device or a sedimentation device. The flocculation device comprises a pipe loop of one or more vertically arranged pipe elements with built-in agitators to create turbulence and plug-type flow through the loop. Each pipe element has a built-in agitator comprising a shaft, which extends through the element, provided with propellers. A motor drives the agitator. The bubble- and floc-containing liquid passes through a static mixer and a diffusor arranged between the flocculation device and the flotation device; The diffusor is connected to the flotation inlet at the lower part of the flotation device. The diffusor results in a speed reduction of the liquid before it enters a flotation chamber of the flotation device. As the static mixer generates bubbles in the liquid from added gas, the process is based on induced gas flotation. This process has several disadvantages over the present invention as external energy is used to build up flocs with agitators and gas is added rather than using existing gas. Another disadvantage is that large shearing forces in the mixer can destroy the already built-up flocs.

The known processes have further disadvantages such as floc destruction by large shearing forces in pumps, cyclone inlets and valves downstream of the flocculation process. Known processes based on recirculation have the disadvantage that the recirculation as such increases the loading on the separation process and the requirement of a recirculation pump. This leads to larger tanks and consumption of external energy by pumps. Agitators in flocculation processes consume energy and give high operating expenses.

SUMMARY OF THE INVENTION

In view of the above mentioned disadvantages associated with prior art processes and systems, the object of the present invention is to provide a process and a plant where said disadvantages are avoided or eliminated. Another object of the present invention is to provide a process and a plant for purification of a liquid by only using the energy of the liquid flow. These objects are achieved by a process and a plant as defined in the appended claims. Further advantages of the process and plant according to the present invention will be evident in the following description.

BRIEF DESCRIPTION OF THE DRAWINGS

The drawing in FIG. 1 discloses schematically a process and a plant for performing the process according to the present invention;

FIG. 2 discloses a side view of a mixing and coagulation device;

FIG. 3 discloses a cross section III—III of FIG. 2;

FIG. 4 discloses schematically a flotation and separation device; and

FIG. 5 discloses a view of a complete plant for performing the process according to the invention.

DETAILED DESCRIPTION OF THE PREFERRED EMBODIMENTS

Figure 1:
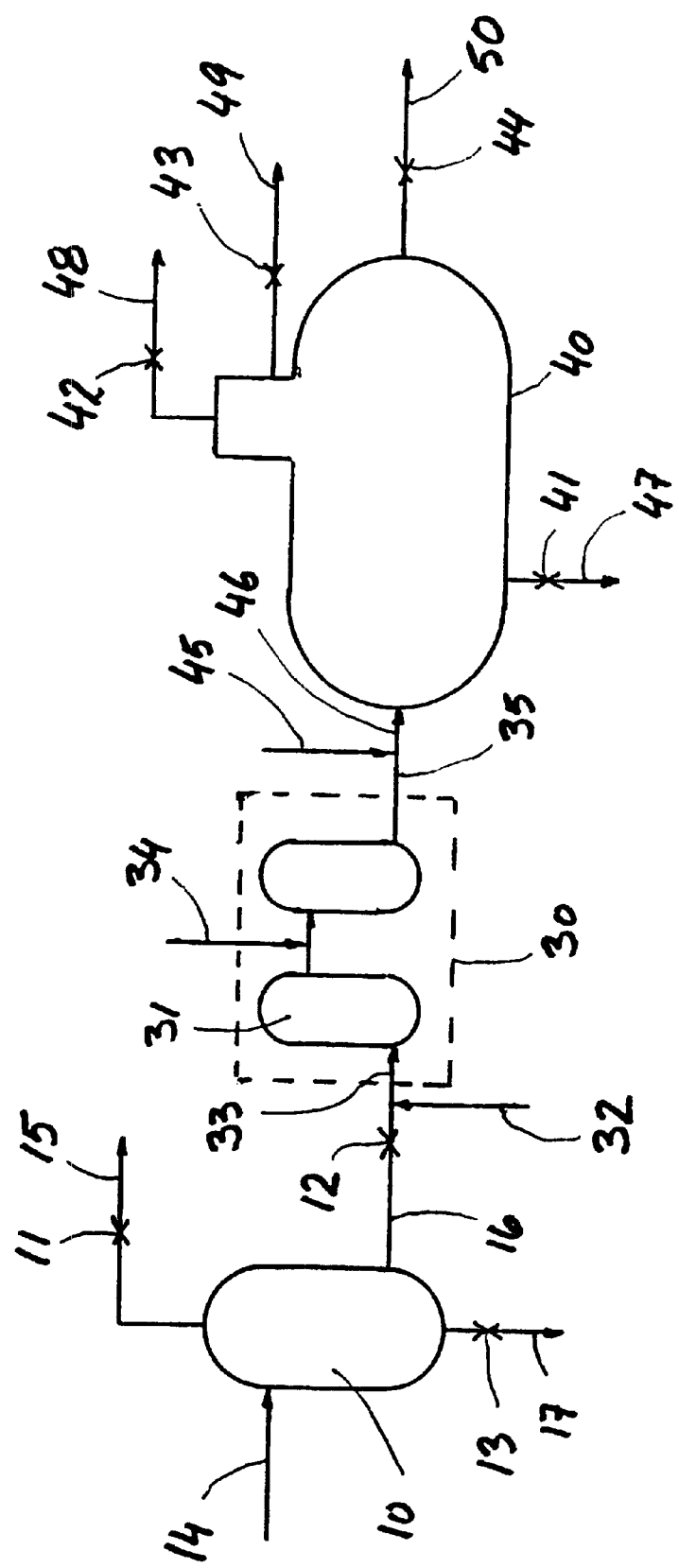

As can be seen in FIG. 1 a plant for performing a process according to the present invention comprises a degassing device 10, a mixing and coagulation device 30 and a flotation and separation device 40.

The degassing device or pre-treatment device 10 comprises a tank having conventional means internally and possibly externally. The input contaminated liquid flow to the plant as such is directed through an inlet 14 to the degassing tank. The flow mainly consists of gas, oil and water as well as some small grains of sand. In the degassing tank 10, gas, liquid and possibly sand are separated.

The gas exits the tank through an outlet 15 and the liquid, the water and the oil exit through an outlet to pipe 16. When sand separation is performed, the sand together with a small amount of the liquid exits through a bottom outlet 17, preferably comprising a pipe and a valve 13. The gas flow and the sand flow thereafter exit the system. The liquid flow is directed to the mixing step 30 of the plant.

The sand separation performed in the degasser device 10 is important for the final oil separation result, when the target is very low oil concentration in the outlet. This is due to the following.

Sand grains have less probability for being separated in the flotation process than oil droplets. Oil droplets float up by themselves because their density usually is lower than the water density, while sand grains settles down because their density is higher than water. Sand grains can however be forced to float up in a flotation process in that the flotation gas bubbles combine with the sand grains or oil droplets-forming aggregates that will float up. The floating speed is dependent on the aggregate density. Aggregates with sand particles will have a higher density than aggregates with oil. Thus, they will have a slower rising velocity and hence, they have a greater chance to escape separation.

Sand can contain up to 20% of oil. Thus, sand can be considered as an oil carrier. Sand escaping separation will then contribute to the oil content in the outlet water from the system. In the plant according to the present invention this is to a great extent avoided because an efficient sand separation is executed in the degasser. This is one of the important advantages of the system.

The degassing tank 10 operates with a pressure, which is higher than in the mixing a step 30 and the flotation tank 40. If the pressure is higher or substantially higher in the degassing tank 10 than in the mixing step 30, the liquid flowing from the degassing tank to the mixing step has to pass through a valve 12 where the pressure is reduced. This pressure reduction causes the dissolved gas in the liquid to be released as small gas bubbles. These gas bubbles promote flotation in the flotation tank 40. The amount of released gas and the bubble size is dependent on the pressure difference between the degassing tank 10 and the mixing step 30. An increased differential pressure increases the amount of released gas and decreases the bubble size.

The pressure in the-degassing tank 10 is controlled by a valve 11. The opening of the valve 11 is set by a control system that measures the pressure in the degassing tank. The control system action is increased pressure—increased opening. The degassing tank has a liquid level that is controlled by the valve 12. A level measuring and control system opens the valve 12 when the level increases and vice versa. Separated sand that accumulates in the tank bottom is flushed out of the tank through the outlet 17 on a preferably intermittent basis and controlled by the valve 13. A timer process variable or an operator opens and closes the valve 13.

The purpose with the degassing tank 10 is to function as a separator for gas, liquid and sand on one hand, and on the other hand to ensure that the liquid contains dissolved gas which is released to flotation gas after a pressure release over a downstream valve.

The mixing and coagulation step 30 may comprise one or more tanks or compartments 31 arranged in series. Each tank or compartment 31 in this case has a specific geometric shape and may have-internal means. The mixing and coagulation step 30 also may be a long pipe arranged geometrically in a specific way. The inlet flow from the degassing tank 10 passes through the mixing step 30 and it is further directed to the flotation and separation tank 40 through an outlet of a pipe 35. It is possible to increase the plant flow capacity by having two or more mixing steps in parallel. This will in addition increase the flow turn-down capacity of the plant.

The geometrical arrangement and the means of the mixing and coagulation step 30 provide establishment of a specific flow pattern and a specific mixing or agitation intensity in the mixing step. The agitation intensity is provided and the flow pattern is initiated only by using the energy contained in the inlet flow to the mixing step. The conversion of the inlet stream energy to agitation energy is described by the overall mechanical energy balance over an agitated volume with fixed solid boundaries, steady state conditions, constant mass flow through a single planar inlet and single planar outlet, incompressible flow according to the following equation:

$$p_1 + \frac{\rho}{2} \cdot V_1^2 + Z_1 \cdot \rho \cdot g = p_2 + \frac{\rho}{2} \cdot V_2^2 + Z_2 \cdot \rho \cdot g + \rho \cdot E_a + \Delta F \quad (1)$$

Where: p=pressure (Pa)
V=average stream velocity (m/s)
Z=distance from a selected reference level (m)
p=fluid density (kg/m$^3$)
g=gravity acceleration or other acceleration due to system movement (m/s$^2$)
$E_a$=agitation energy per unit mass inside the tank/compartment (J/kg)
$\Delta F$=viscous energy dissipation to internal energy or friction loss through the system (Pa)
subscription 1 indicates inlet 33
subscription 2 indicates outlet 35

The term $E_a$ in equation 1 represents the agitation energy inside the volume that is agitated. Since agitation is equivalent with motion, it represents only the kinetic energy of the fluid moving around inside the agitated volume. The amount of agitation energy is usually larger than the amount of energy required for the transport of the liquid through the agitated volume. This means that the flow pattern has to have some kind of rotational behaviour. The construction of the mixing and coagulationstep 30 has to reflect the fundamentals stated above. This means that the construction must create a continuos rotational behaviour of the liquid inside the agitated volume, by using some of the energy in the inlet stream.

The agitation intensity is the energy expressed by the term $\rho \cdot E_a$ per unit time (seconds). The agitation intensity is important for the coagulation and flocculation processesand shall neither be too high nor too low. Too high agitation intensity will cause oil droplet, floc or aggregate break-up. Too low agitation intensity gives a slow coagulation/flocculation rate. The agitating intensity is decreasing from the inlet 33 to the outlet of the pipe 35 in the is mixing step. This is important since droplets, flocs or aggregates are more susceptible to break up as they grow. A larger droplet requires a lower agitation intensity not to break up, compared to a small one. Thus, as the droplets, flocs or aggregates grow through the mixing step, the agitation intensity should decrease through the mixing step, to prevent break-up. The construction of the mixing step 30 as described above promotes coagulation and flocculation of small oil droplets and particles to larger oil droplets and particles. The creation of aggregates between the oil droplets/particles and the gas bubbles is also promoted.

The coagulation, the flocculation and the establishment of oil-gas-aggregates may be improved by adding chemicals through an injection line 32 before the mixing device and on chosen places in the mixing step 30 through one or more injection lines as indicated by 34. However, adding chemicals is not always necessary.

The purpose of the mixing step 30 is to ensure coagulation and flocculation of particles and oil droplets, and to ensure creation of aggregates between particles/oil droplets and gas bubbles. It is substantial in connection with the present invention that this is achieved by using only the energy from the inlet flow for agitation and mixing.

An embodiment of a mixing step design is shown in the FIGS. 2 and 3. The mixing step is built as a cylindrical vessel or pipe with flat or curved end caps. The vessel is divided into four compartments 31 by three partition walls 36. Each partition wall 36 has a hole or slot 37 that allows the liquid to flow through the mixing step. The inlet 33 is located in the first compartment at one of the vessel ends. The outlet 35 is positioned at the opposite vessel end in the final compartment. The general design measures of the mixing step is preferably that the distance between the partition walls 36 is minimum one quarter of or maximum ten times the outside cylinder diameter; the length of the cylindrical part is approximately equal to four times the distance between the partition walls. The inlet 33 preferably has a position and direction that is parallel to the tangent of the cylindrical vessel. The preferred tangential inlet sets up a main rotational flow pattern with the rotation axis substantially equal to the cylinder centre axis through the whole mixing step. The flow pattern is disturbed when the stream passes the partition wall holes 37. This disturbance creates additional eddy currents in the second, third and fourth compartments and so on in addition to the main rotational flow pattern, which promotes the mixing and thus the coagulation. In the final compartment, the stream exits the mixing step through the outlet of the pipe 35. The outlet of the pipe 35 is preferably positioned at the centre of the vessel end cap, and it has a direction that is parallel to the centre axis of the vessel cylinder. The outlet of the pipe 35 might have a vortex breaker at the inside to break up the main rotation in the mixing step. The correct agitation intensity in the different parts of the mixing step is determined by selecting the correct diameters of the inlet 33, partition wall holes 37 and the outlet of the pipe 35.

The mixing step design shown in the FIGS. 2 and 3 has managed to grow oil droplets from a mean diameter of 10 microns up to a mean diameter of 100 to 400 microns. This has been done in laboratory tests with the use of a coagulation chemical injected immediately upstream of the inlet 33 of the pipe 16. In the tests the retention time in the mixing step was 10 seconds.

The flotation and separation tank 40, as shown in FIG. 4, is equipped with internal structural packing material 52. The packing material functions as a lamella separator. This provides a large separation area and a compact design of the flotation tank. On the inlet side of the tank there is a compartment 51, and on the outlet side of the tank there is a compartment 53. The tank may also have a storage volume/compartment 54 on the outside. The storage volume/compartment 54 might be connected to the flotation tank 40 by a pipe. The inlet flow from the mixing step 30 is directed into the flotation tank 40 via an inlet 46 to the compartment 51, which is arranged upstream of the packing material 52. From here the liquid flows through the packing material 52 out on the other side and exits through the outlet 50.

On the way through the packing material oil droplets, particles, gas bubbles and aggregates of oil, particles and gas are separated according to the flotation or the sedimentation principle. The packing material is designed such that separated oil, particles and gas are transported to the upper part of the tank and into the storage volume 54. The storage volume, as indicated above, might be an outside compartment placed on the upper side of or outside the tank or it might be the very upper part of the tank. It is important to shield the storage volume from contact with the outlet compartment 53. The shielding shall prevent separated oil or particles to be dragged into the main outlet 50. The transportation of separated material upwards through the packing material and into the storage volume 54 results in a dewatering of the separated material. The storage volume then contains a pure gas phase and a phase of separated material that contains small amount of water. These phases can then be tapped off separately from the flotation tank. Gas from the storage volume exits the system through the outlet of pipe 48. Separated oil/particles preferably exits the system through the outlet of pipe 49.

The pressure in the flotation and separation tank 40 is controlled by a valve 42, as shown in FIG. 1. A control system measuring the pressure in the tank adjusts the opening of valve 42. The control system has an increased pressure-increase opening action. It is important to maintain a constant pressure in the flotation tank since the size of the gas bubbles in the floating aggregates of bubbles and particles is dependent on the pressure. A pressure increase will reduce the bubble sizes and likewise the buoyancy of the aggregates. The pressure then has direct effect on the separation performance.

The storage volume has a liquid level that must be controlled. A valve 44 on the main outlet 50 controls this level. A control system that measures the level in the storage volume adjusts the opening of the valve 44 by increased level—increased opening action.

The removal of dewatered separated material is controlled by a valve 43. The removal is preferably intermittent.

The function of the packing material and its construction to optimise the separation is described in the following.

The flow in the packing material channels should preferably be laminar. This means that the Reynolds number shall be in the laminar range. In addition, the flow should preferably be stable. A stable flow will not be disturbed by acceleration forces and forces from separating gas and particles. The laminar flow requirement provides a low flow velocity in the channels. A too low velocity can give unstable flow conditions. To maintain a stable flow the Froudes number in the packing channels must be greater than $4 \cdot 10^{-5}$ at the maximum acceleration force the separation can experience.

The packing material should preferably not have construction details or be installed in such way that accumulation of large volumes of gas and other separated contaminants are retained inside the packing. If the accumulated contaminants suddenly are released from their accumulation sites, it can disturb the flow and thus the separation.

The inlet compartment 51 upstreams of the packing material 52 is constructed in such a way that the mixing and flocculation occur in said compartment without using external energy. The construction criteria for optimum mixing and flocculation are equal to those stated for the mixing step 30. In addition, the following two criteria should preferably be fulfilled: First the agitation intensity in the inlet compartment 51 must be lower than the agitation intensity in the last compartment 31 of the mixing step 30. Secondly the inlet flow from the mixing step 30 contains small gas bubbles, which should preferably be evenly distributed through the whole compartment 51. Gas bubbles distributed through the whole compartment will maximise the probability for formation of aggregates of gas bubbles, oil droplets and other particles. This will in turn enhance the separation efficiency.

Chemicals may be added to the inlet 46 of the flotation tank 40, through an injection line 45 to improve the flocculation and separation in the tank. A small fraction of the particles entering the tank settles down in the lower part of the tank and on the packing material. The tank may therefore be equipped with flushing means including a valve 41 to remove these particles through a specific outlet 47 below the packing material.

The flotation tank 40 performs the final flocculation in the inlet compartment 51 of the flotation tank 40, separation of oil droplets, particles and gas as well as dewatering i.e. removal of water, from the separated contaminants. Purified water is removed from the flotation tank 40 through the outlet 50.

The flow into the packing material in the flotation tank is distributed across the whole cross section of the packing. The upward flow of gas and separated contaminants in the packing material develops a downward flow of water. The bulk flow of water is forced down to the lower part of the packing and is further directed to the flotation tank outlet side 53. The preferable position for the water to exit the outlet compartment of the flotation tank is at the lower half of the end cap or the lower side of the end cap. The outlet 50 should then preferably be positioned in this area to maintain the overall flow pattern through the packing in the flotation tank.

An example of a flotation tank design is shown in FIG. 4.

The inlet 46 of the flotation tank is preferably positioned at the top of the tank. The direction of the inlet flow is pointing downwards into the inlet compartment 51. When the size of the inlet is made according to the desired inlet compartment design criteria, the construction of the compartment will create several large eddy currents between the inlet jet and the compartment walls. This creates good mixing with correct agitation intensity. Because of the downward flow at the inlet, gas bubbles are distributed throughout the entire inlet compartment.

The outlet 50 is positioned just below the centre line of the tank. This position will not set up a flow pattern in the outlet compartment 53 that will disturb the overall flow pattern in the packing 52.

The storage volume 54 for the separated oil and gas is positioned in a shielded way from the outlet compartment 53. The packing prevents a direct contact between the oil in the storage volume 54 and the water in the outlet compartment 53. With the method or process according to the present invention, degassing of the inlet flow and removal of sand are made as a pre-treatment. Because sand is an oil carrier, removal of sand as pre-treatment is important when very low oil outlet concentration is a target. Furthermore, existing dissolved gas in the inlet flow is utilized to produce small gas bubbles used for the flotation. This means that existing gas in the inlet liquid is used as flotation gas and there is no use of any external energy source for the supply of this utility.

The coagulation and flocculation made in the mixing step is performed without external energy and special means such as an agitator or pump for creating agitation. The geometrical design of the mixing step and the existing energy in the inlet flow are used to create a specific flow pattern and a specific agitation intensity promoting coagulation and flocculation.

The agitation intensity is decreasing through the entire plant, which is advantageous for the coagulation, flocculation as well as separation.

The flotation tank 40 comprises a specific compartment 51 for the final flocculation immediately upstream of the structural packing 52 where the separation is performed. The arrangement and design of the inlet 46 to the compartment create a flow pattern which increases the formation of aggregates between gas bubbles, particles and oil droplets. These advantages are favourable and increase the efficiency of the separation.

As the packing material in the flotation tank functions according to the lamella principle, a large separation area is achieved, which makes the flotation tank very compact. The tank and the lamella packing are designed in such a way that laminar and stable flow are achieved in the lamella packing.

Due to the design of the flotation tank 40, water is removed from the separated contaminants and a concentration of these contaminants, i.e. sludge thickening, is achieved.

The process has very low if any consumption of external energy in relation to prior art. The plant according to the invention is very compact, and it has a low weight compared to prior art plants. This provides low investment cost and low total lifetime cost.

An example of a plant for the purification of produced water according to the present invention is shown in FIG. 5. The plant is designed for a capacity of 700 $m^3$/h or 105 700 BPD (barrel per day). The skid measures for the plant are L×W×H: 7 m×8 m×7.8 m. The only energy consumed in this plant is the energy used by the instrumentation. The plant is capable to purified water having an oil concentration down to 10 ppm or even lower, and performs full degassing of the water.

The example above clearly shows that the inventive concept is competitive and has advantages compared to prior art technology for purification of produced water.

We claim:

1. A process for purification of a contaminated liquid contaminated by at least one of gas, other liquids, and solid materials, comprising the steps of:

degassing the contaminated liquid in a degassing device whereby at least a part of the gas is removed from the contaminated liquid, introducing the contaminated liquid into a mixing and coagulation device, so as to create a main rotational flow pattern of the contaminated liquid flowing through the mixing and coagulation device, passing the contaminated liquid through at least one hole in at least one partition wall of the device so as to create a further flow pattern, to achieve mixing and thereby coagulation and flocculation of contaminants respectively in the contaminated liquid by way of said flow patterns, utilizing the energy in the contaminated liquid flowing into the mixing and coagulation device, and separating coagulated or flocculated contaminants as well as remaining gas and other liquids from the contaminated liquid to be purified in a flotation and separation device.

2. A process according to claim 1, wherein:

the introducing step includes introducing the contaminated liquid into the mixing and coagulation device substantially tangentially into a first compartment creating a main liquid rotation around a longitudinal axis of the device through the first as well as further compartments, random eddy currents thereby being created by the flow through holes in partition walls defining the compartments, the main rotational flow pattern thereby being substantially maintained through the device, and the agitation intensity decreases from the inlet to the outlet.

3. A process according to claim 1, wherein:

the introducing step includes introducing the contaminated liquid to be purified into a mixing compartment upstream of a packing material of the flotation and separation device through an inlet in an upper part, on a top side, of the mixing compartment.

4. A process according to claim 1, further comprising:

directing a flow to the flotation and separation device downwards into an inlet compartment of the flotation and separation device, at least one of a separated liquid and particles being directed to a storage volume, purified liquid entering an outlet compartment, and a packing thereby dividing the storage volume and the outlet compartment.

5. A process according claim 1, further comprising:

controlling an amount of dissolved gas remaining in the contaminated liquid flow at an inlet to the mixing and coagulation device by a control valve at an outlet of the degassing device.

6. A process according to claim 1, further comprising:

controlling an amount of gas and a pressure of the contaminated liquid by at least one of a control valve at a gas outlet and a control valve at a liquid outlet of a storage volume connected with the flotation and separation device to produce gas bubbles of suitable size for flotation in the flotation and separation device.

7. A plant for purification of a contaminated liquid contaminated by at least one of gas, other liquids, and solid materials, comprising:

a degassing tank for degassing at least a part of the gas from the contaminated liquid, a mixing and coagulation device that comprises an inlet, for introducing the contaminated liquid flow, adapted to create a main rotational flow pattern of the contaminated liquid flowing through said device, an outlet, and at least one partition wall having at least one hole through which the contaminated liquid is passed so as to create a further flow pattern, to achieve mixing and thereby coagulation and flocculation of contaminants respectively in the contaminated liquid by means of said flow patterns, utilizing the energy in the contaminated liquid flowing into said device, and a flotation and separation device for separating coagulated or flocculated contaminants as well as remaining gas and other liquids from the contaminated liquid to be purified.

8. A plant according to claim 7, wherein:

the mixing and coagulation device is divided into a plurality of compartments by partition walls, each wall comprising a hole allowing the contaminated liquid to flow from one compartment to a next compartment, an inlet being arranged substantially tangentially in one end of the mixing and coagulation device, and an outlet being arranged essentially centric in another end of the mixing and coagulation device.

9. A plant according to claim 8, wherein:

a distance between two adjacent partition walls being essentially equal to an outer diameter of the mixing and coagulation device.

10. A plant according to claim 7, wherein:

the outlet of the coagulation and mixing device comprises an internal vortex breaker.

11. A plant according to claim 7, wherein:

the flotation and separation device comprises an inlet positioned at a top of the flotation and separation device directing a flow from the inlet downwards into an inlet compartment, a packing material separating a storage volume for oil and an outlet compartment for purified water, an outlet from the outlet compartment positioned below a center line or at an end bottom side of the flotation and separation device.

12. A plant according to claim 11, wherein:

the packing material comprises a lamella separator.

* * * * *